(12) United States Patent
Osmanis et al.

(10) Patent No.: US 10,728,534 B2
(45) Date of Patent: Jul. 28, 2020

(54) VOLUMETRIC DISPLAY SYSTEM AND METHOD OF DISPLAYING THREE-DIMENSIONAL IMAGE

(71) Applicant: Lightspace Technologies, SIA, Marupe, Marupes novads (LV)

(72) Inventors: Ilmārs Osmanis, Mārupes novads (LV); Krišs Osmanis, Babītes novads (LV); Mārtiņš Narels, Riga (LV); Uģis Gertners, Riga (LV); Roberts Zabels, Riga (LV); Armands Šmaukstelis, Rēzeknes novads (LV)

(73) Assignee: LightSpace Technologies, SIA, Marupe, Marupes novads (LV)

( * ) Notice: Subject to any disclaimer, the term of this patent is extended or adjusted under 35 U.S.C. 154(b) by 0 days.

(21) Appl. No.: 16/050,359

(22) Filed: Jul. 31, 2018

(65) Prior Publication Data

US 2020/0045302 A1     Feb. 6, 2020

(51) Int. Cl.
*H04N 13/388* (2018.01)
*G02B 27/09* (2006.01)
(Continued)

(52) U.S. Cl.
CPC ....... *H04N 13/388* (2018.05); *G02B 27/0955* (2013.01); *G02B 27/30* (2013.01); *G03B 21/008* (2013.01); *G09G 3/003* (2013.01)

(58) Field of Classification Search
CPC .. H04N 13/388; G02B 27/0955; G02B 27/30; G03B 21/008; G09G 3/003
(Continued)

(56) References Cited

U.S. PATENT DOCUMENTS

2002/0163482 A1    11/2002  Sullivan
2003/0223043 A1*   12/2003  Yoshino ............... H04N 13/395
                                                      353/10
(Continued)

FOREIGN PATENT DOCUMENTS

WO       2017055894 A1    4/2017

OTHER PUBLICATIONS

Liu S., Cheng D., Hua H. An optical see-through head mounted display with addressable focal planes. In: Proceedings of the Seventh IEEE/ACM Inter-national Symposium on Mixed and Augmented Reality (ISMAR '08). Cam-bridge, UK. IEEE; 2008, pp. 33-42.*

(Continued)

*Primary Examiner* — Jin Ge
(74) *Attorney, Agent, or Firm* — Ziegler IP Law Group LLC.

(57) ABSTRACT

A volumetric display system for displaying a three-dimensional image. The volumetric display system includes a multi-plane volumetric display with display elements; a graphics processing unit to process the aforesaid image to generate image planes corresponding thereto; and a projector communicably coupled to the aforesaid elements. The projector includes a light source for emitting a light beam; a spatial light modulator to modulate the emitted light beam; a telecentric projection arrangement to direct the modulated light beam towards the display elements, whilst providing a substantially-constant magnification of the modulated light beam; and a driver module coupled to the light source, the spatial light modulator. The driver module receives the image planes from the graphics processing unit, and projects the image planes upon the display elements, by way of the modulated light beam.

17 Claims, 5 Drawing Sheets

(51) Int. Cl.
*G02B 27/30* (2006.01)
*G03B 21/00* (2006.01)
*G09G 3/00* (2006.01)

(58) Field of Classification Search
USPC .......................................................... 345/419
See application file for complete search history.

(56) References Cited

U.S. PATENT DOCUMENTS

| | | | | |
|---|---|---|---|---|
| 2005/0057812 A1* | 3/2005 | Raber | ................ | G02B 17/0896 |
| | | | | 359/619 |
| 2005/0286101 A1* | 12/2005 | Garner | .................... | G03H 1/02 |
| | | | | 359/9 |
| 2007/0058229 A1* | 3/2007 | Hudyma | ............ | G02B 27/0025 |
| | | | | 359/196.1 |
| 2008/0117289 A1* | 5/2008 | Schowengerdt | ..... | G02B 26/005 |
| | | | | 348/46 |
| 2008/0252556 A1* | 10/2008 | Tseng | .................... | G09G 3/003 |
| | | | | 345/6 |
| 2009/0284489 A1* | 11/2009 | Batchko | ............... | H04N 13/388 |
| | | | | 345/173 |
| 2011/0075257 A1* | 3/2011 | Hua | .................... | G02B 27/017 |
| | | | | 359/464 |
| 2011/0128555 A1* | 6/2011 | Rotschild | ........... | G02B 27/2271 |
| | | | | 356/625 |
| 2016/0260258 A1* | 9/2016 | Lo | .............................. | G06T 7/00 |
| 2017/0293259 A1* | 10/2017 | Ochiai | ................. | G03H 1/0005 |
| 2018/0131927 A1* | 5/2018 | Vora | .................... | G02B 27/2292 |
| 2018/0220127 A1* | 8/2018 | Khan | .................... | G02B 5/1828 |

OTHER PUBLICATIONS

Jon Rodriguez, Volumetric World Display, Stanford Computer Science Honors Thesis, May 15, 2012.*
International Search Report and Written Opinion of the International Searching Authority, Application No. PCT/EP2019/068573, dated Sep. 9, 2019, 14 pages.

* cited by examiner

VOLUMETRIC DISPLAY SYSTEM AND METHOD OF DISPLAYING THREE-DIMENSIONAL IMAGE

TECHNICAL FIELD

The present disclosure relates generally to display systems; and more specifically, to volumetric display systems for displaying three-dimensional images, such as volumetric display systems comprising multi-plane volumetric displays, graphics processing units and projectors. Furthermore, the present disclosure also relates to methods of displaying three-dimensional images via the aforementioned volumetric display systems.

BACKGROUND

Over the past few decades, display technologies have witnessed significant technological advancements that allow for realistic two-dimensional imaging, as well as three-dimensional imaging. Generally, this can be achieved by stereoscopic-type display systems employing two-dimensional screens (such as liquid crystal displays, light-emitting diode-based displays, and the like) for recreating perceivably three-dimensional images, by utilizing binocular disparity. In such a case, different two-dimensional views of a given three-dimensional object/scene are rendered upon (i) separate two-dimensional displays for right and left eyes of a viewer, or (ii) a single two-dimensional display that is typically shared in a time multiplexed or polarization multiplexed manner for both the right and left eyes of the viewer. When such different two-dimensional views are combined in the viewer's brain, the viewer perceives depth of the given three-dimensional object/scene.

However, there exist limitations associated with the use of two-dimensional displays for three-dimensional imaging. Firstly, using binocular disparity for perceiving depth leads to vergence-accommodation conflict. Secondly, such two-dimensional displays are often implemented in head-mounted devices (such as virtual reality devices, augmented reality devices, and the like), and prolonged use of such head-mounted devices leads to discomfort and eye fatigue for the viewer. Therefore, nowadays, developments are being made to display three-dimensional objects/scenes upon three-dimensional displays.

Presently, the display systems employ autostereoscopic displays in order to overcome the aforesaid limitations of two-dimensional displays for three-dimensional imaging purposes. Autostereoscopic displays are of various types that include, but are not limited to, multiview-type displays, holography-type displays and volumetric-type displays. The multiview-type displays typically recreate multiple views of the given three-dimensional object/scene as observable from different positions by employing, for example, parallax barriers. However, such multiview-type displays suffer from issues such as abrupt changes within views, reduced light intensity and lower imaging resolution. The holography-type displays typically capture light field emanating from the given three-dimensional object/scene by registering amplitude, wavelength and phase information, and reproducing the given three-dimensional object/scene using coherent light. However, such holography-type displays require significant computational resources and dynamically variable spatial light modulators (SLMs) with very high resolution, which currently are not available, thus limiting the visual presentation attainable by true holographic-type display systems.

The volumetric-type displays typically employ projection equipment for projecting light in a three-dimensional volume, active light-emitting voxels, or optically active media, to create a three-dimensional image of the given three-dimensional object/scene. However, there are a number of limitations associated with the display systems employing conventional volumetric-type displays such as difficulty in scalability, computationally intensive data processing, and the like. Specifically, such conventional volumetric-type displays are often bulky and have substantially large dimensions. Furthermore, in volumetric display technologies utilizing image projection, noticeable differences of image magnification are generally associated with the three-dimensional image displayed via such volumetric-type displays. In other words, the viewer is often able to perceive substantial change in magnification within the displayed three-dimensional image.

Further a volumetric display device utilizing a rear image projection in conjunction with discretized and selectively addressable light diffusing projection surfaces of the projection volume can be substantially large and bulky. A major reason attributing to the bulkiness of the system is a considerably long optical path of the modulated light from the image projector (spatial light modulator) to the projection volume (for example, rear light diffusing surface which is the closest to the spatial light modulator). A typical length of such optical path can be for example 2 meters or 1.5 meters. To reduce the linear size of the device, the optical path could be folded by utilization of plane mirrors. Nevertheless, utilization of multiple reflecting surfaces, reduces the overall light intensity hitting the projection volume thus reducing the image brightness and contrast. Moreover, often practical number of flat mirrors for the folding of optical path might not result in considerably small form-factor of such volumetric display device.

One of ways how to reduce the overall optical path is to utilize a short-throw or ultra short-throw image projector. Such image projector achieves great image magnification at considerably short distances and thus is being characterized by a high throw-ratio. Typically, this is being achieved by utilization of wide-angle or ultra wide-angle projection lenses. In the context of volumetric display, utilization of such wide-angle projection lens would result in a considerable change of image magnification throughout the projection volume (individual image planes associated with the volumetric 3D image). Subsequently, this results in an aberrant representation of three dimensional (3D) objects and scenes, as the different parts of the 3D image have varying magnification. Although by a much subtle amount, a varying image magnification is a problem occurring also in long focal-length projection lenses originally utilized in the image projection subsystem of the volumetric display systems.

Therefore, in light of the foregoing discussion, there exists a need to overcome the aforementioned drawbacks associated with existing display systems for three-dimensional imaging.

SUMMARY

The present disclosure seeks to provide a volumetric display system for displaying a three-dimensional image. The present disclosure also seeks to provide a method of displaying a three-dimensional image. The present disclosure seeks to provide a solution to the existing problems such as difficulty in scalability and noticeable differences of image magnification within a displayed three-dimensional image, that are associated with conventional display systems for three-dimensional imaging. An aim of the present disclosure is to provide a solution that overcomes at least partially the problems encountered in prior art and provides a more compact volumetric display system that is configured to provide substantially-constant image magnification associated with displayed depth planes of the three-dimensional image.

In one aspect, an embodiment of the present disclosure provides a volumetric display system for displaying a three-dimensional image, the volumetric display system comprising:

a multi-plane volumetric display comprising a plurality of display elements, wherein one physical image depth plane of the volumetric display is implemented by way of one display element;

a graphics processing unit configured to process the three-dimensional image to generate a plurality of image depth planes corresponding thereto; and a projector communicably coupled to the graphics processing unit and the multi-plane volumetric display, wherein the projector comprises:

a light source for emitting a light beam therefrom;

a spatial light modulator arranged on an optical path of the emitted light beam, the spatial light modulator being configured to modulate the emitted light beam;

a telecentric projection arrangement arranged on an optical path of the modulated light beam, the telecentric projection arrangement being configured to direct the modulated light beam towards the plurality of display elements, whilst providing a substantially-constant magnification of the modulated light beam across the plurality of display elements; and a driver module coupled to the light source and the spatial light modulator, wherein the driver module is configured to receive the plurality of image planes corresponding to the three-dimensional image from the graphics processing unit, and to control operations of the light source and the spatial light modulator for projecting the plurality of image planes upon the plurality of display elements, by way of the modulated light beam.

In another aspect, an embodiment of the present disclosure provides a method of displaying a three-dimensional image, the method comprising:

processing the three-dimensional image to generate a plurality of image planes corresponding thereto;

receiving the plurality of image planes corresponding to the three-dimensional image;

emitting a light beam;

modulating the emitted light beam;

directing the modulated light beam, whilst providing a substantially-constant magnification of the modulated light beam; and projecting the plurality of image planes, by way of the modulated light beam.

Embodiments of the present disclosure substantially eliminate or at least partially address the aforementioned problems in the prior art and provides substantially-constant image magnification across the three-dimensional image. The three dimensional image refers to an image projected in the physical projection volume comprised of physical image planes which can be observed by a user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
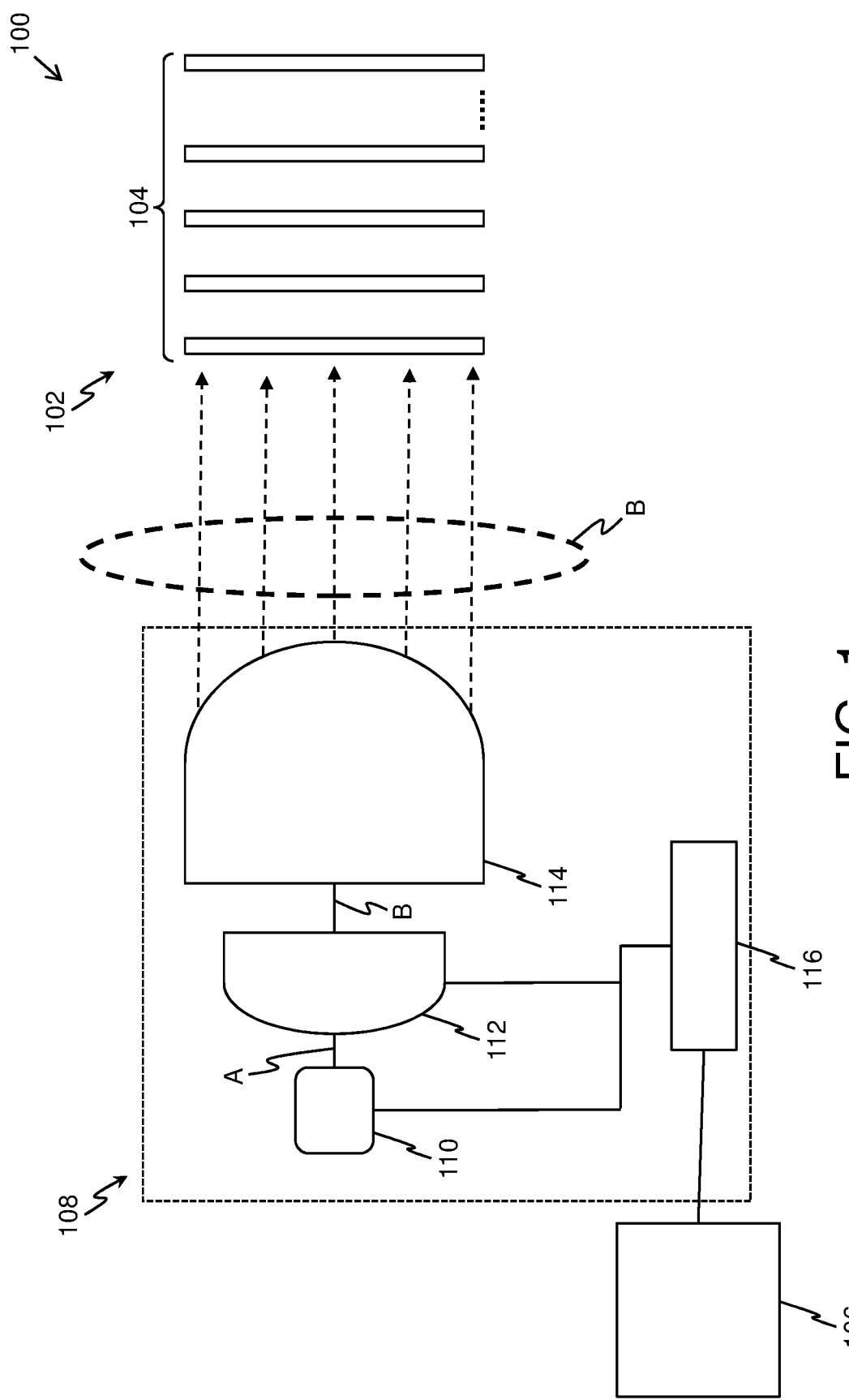
FIG. 1 is a schematic illustration of a volumetric display system for displaying a three-dimensional image, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a volumetric display system for displaying a three-dimensional image, the volumetric display system comprising:

a multi-plane volumetric display comprising a plurality of display elements, wherein one physical image depth plane of the volumetric display is implemented by way of one display element;

a graphics processing unit configured to process the three-dimensional image to generate a plurality of image planes corresponding thereto; and a projector communicably coupled to the graphics processing unit and the multi-plane volumetric display, wherein the projector comprises:

a light source for emitting a light beam therefrom;

a spatial light modulator arranged on an optical path of the emitted light beam, the spatial light modulator being configured to modulate the emitted light beam;

a telecentric projection arrangement arranged on an optical path of the modulated light beam, the telecentric projection arrangement being configured to direct the modulated light beam towards the plurality of display elements, whilst providing a substantially-constant magnification of the modulated light beam across the plurality of display elements; and a driver module coupled to the light source and the spatial light modulator, wherein the driver module is configured to receive the plurality of image planes corresponding to the three-dimensional image from the graphics processing unit, and to control operations of the light source and the spatial light modulator for projecting the plurality of image planes upon the plurality of display elements, by way of the modulated light beam.

In another aspect, an embodiment of the present disclosure provides a method of displaying a three-dimensional image, the method comprising:

processing the three-dimensional image to generate a plurality of image planes corresponding thereto;

receiving the plurality of image planes corresponding to the three-dimensional image;

emitting a light beam;

modulating the emitted light beam;

directing the modulated light beam, whilst providing a substantially-constant magnification of the modulated light beam; and projecting the plurality of image planes, by way of the modulated light beam.

The present disclosure provides the aforementioned volumetric display system and the aforementioned method of displaying the three-dimensional image, via such a volumetric display system. Beneficially, embodiments of the description enable to implement the volumetric display system in more compact size. Furthermore, the multi-plane volumetric display is able to provide substantially-constant image magnification associated with the individual physical image depth planes of the three-dimensional image projected thereupon. Therefore, a viewer of the volumetric display system is able to perceive actual size of entities/attributes depicted in the displayed three-dimensional image. Furthermore, the aforementioned method requires lesser computational efforts for displaying the three dimensional image as compared to conventional volumetric display system.

Throughout the present disclosure, the term "volumetric display system" used herein relates to specialized equipment that is configured to display the three-dimensional image to a viewer in a manner that the three-dimensional image appears to have actual physical depth. In other words, the volumetric display system is operable to act as a device for displaying the three-dimensional image in a real three-dimensional volume.

It will be appreciated that the three-dimensional image relates to an image of at least one three-dimensional object (for example, such as a statue, furniture, and the like), a three-dimensional scene (for example, such as a beach scene, a mountainous environment, and the like), and so forth.

The multi-plane volumetric display comprises the plurality of display elements, wherein one physical image depth plane of the volumetric display is implemented by way of one display element. Throughout the present disclosure the term "multi-plane volumetric display" used herein relates to equipment that is configured to facilitate display of the three-dimensional image thereupon. Furthermore, the term "display element" used herein relates to an optical component configured to allow display of at least a part of the three-dimensional image thereupon. In other words, a given display element is configured to receive projection of a given image plane thereupon. It will be appreciated that the plurality of display elements are configured to receive thereupon, the projection of the plurality of image planes, to display the three-dimensional image at the multi-plane volumetric display. Furthermore, a physical arrangement of the plurality of display elements constitutes the real three-dimensional volume of the multi-plane volumetric display whereat the three-dimensional image is displayed.

Optionally, a number of the plurality of display elements within the multi-plane volumetric display lies within a range of 2 to 50. As an example, the multi-plane volumetric display may comprise 2, 3, 4, 5, 10, 15, 20, 25, 30, 35, 40, 45 or 50 display elements. Alternatively, optionally, the number of the plurality of display elements within the multi-plane volumetric display is greater than 50. As an example, the multi-plane volumetric display may comprise 55, 60, 65, 70, 75, 80, 85, 90, 95 or 100 display elements.

Optionally, the plurality of display elements are arranged to have equal spacing therebetween. Alternatively, optionally, the plurality of display elements are arranged to have unequal spacing therebetween. In an example, the plurality of display elements are arranged as a 14 centimeter thick stack. In such a case, 15 display elements may be arranged to have equal 1 centimeter spacing therebetween. In said arrangement the multi-plane volumetric display is able to show images of 14 cm in the "depth" direction i.e. the resolution in Z-direction is 15.

Optionally, the plurality of display elements are substantially-flat in shape. Alternatively, optionally, the plurality of display elements are substantially-curved in shape.

Optionally, the plurality of display elements is implemented by way of a plurality of optical diffusers which are electrically controllable. Throughout the present disclosure, the term "optical diffuser" used herein relates to an optical component that is configured to display a given image plane that is projected thereupon. The plurality of optical diffusers are electrically controllable in order to select which of the diffuser is used for projecting image plane (in diffused state) and which of the diffusers are optically transparent. Therefore, the plurality of optical diffusers are configured to display the plurality of image planes that are projected thereupon, to display the three-dimensional image.

Optionally, the plurality of optical diffusers are implemented by way of cholesteric-type liquid crystal diffusers. In such a case, the plurality of optical diffusers are electrically switchable (controllable) to toggle between an optically transparent state and an optically diffusive state. Notably, a given optical diffuser displays a given image plane projected thereupon, only while the given optical diffuser is in the optically diffusive state. Therefore, in operation, the plurality of optical diffusers are rapidly and sequentially switched to the optically diffusive state, to display plurality of image planes, thereby, producing the actual physical depth associated with the three-dimensional image. Therefore, at a given point of time, only one optical diffuser may be in the optically diffusive state while the remaining optical diffusers are in the optically transparent state. Example of the plurality of optical diffusers include, but are not limited to, Liquid Crystal (LC) optical diffusers. In general, if the optical diffuser can be controlled with electric signals it might be referred as an electrically controllable optical diffuser.

Optionally the projection volume (the volume of multi-plane volumetric display), can be implemented with a sweeping (reciprocating) single display element. The sweeping single display element can be a passive diffuser element. The passive diffuser element can be for example a light diffusing membrane, film or a sheet. Further optionally a multi-plane volumetric display volume can be implemented with two or more sweeping (or moving or reciprocating) display elements (diffusers). In said embodiment the display elements move rapidly from one (depth) distance to other as the respective image planes representing the depth distance are projected to the display element. Further optionally a multi-plane volumetric display volume can be implemented with combination of moving/sweeping display element and stationary display element (i.e. with diffuser elements which are electrically controllable).

The volumetric display system comprises the graphics processing unit configured to process the three-dimensional image to generate the plurality of image planes corresponding thereto. In other words, the graphics processing unit is configured to decompose the three-dimensional image into its corresponding plurality of image planes. Throughout the present disclosure, the term "graphics processing unit" relates to specialized hardware, software, firmware, or a combination of these, that is configured to process the three-dimensional image to generate the plurality of image planes corresponding thereto. It will be appreciated that the graphics processing unit typically contains a large number (for example, several thousand) of processing cores allowing for parallel processing of three-dimensional image data, thus boosting the processing performance. Therefore, the graphics processing unit can optionally be configured to parallelly process the multiple three-dimensional images at a substantially-high computation rate to generate a plurality of image planes corresponding to each image of the multiple three-dimensional images.

Throughout the present disclosure, the term "image plane" relates to a two-dimensional portion (namely, a slice or a fragment) of the three-dimensional image. Notably, the three-dimensional image is a combination of its constituent plurality of image planes. As an example, a three-dimensional image IMG may depict a three-dimensional scene of a park having a fountain, a carousel and a pond. Specifically, regions R1, R2 and R3 of the three-dimensional image IMG may depict the fountain, the carousel and the pond respectively. In such an example, the graphics processing unit may process the aforementioned three-dimensional image IMG to generate the plurality of image planes corresponding thereto. In such an example, the region R1 of the three-dimensional image IMG depicting the fountain may constitute a first image plane, the region R2 of the three-dimensional image IMG depicting the carousel may constitute a second image plane and the region R3 of the three-dimensional image IMG depicting the pond may constitute a third image plane. In such an example, the given three-dimensional image IMG can be understood to be a combination of the first, second and third image planes.

Optionally, the three-dimensional image is processed to generate a predefined number of image planes corresponding thereto. In an embodiment, the predefined number of plurality of image planes generated upon processing of the three-dimensional image is equal to the number of the plurality of display elements within the multi-plane volumetric display. In such a case, all display elements are in use, and one image plane is to be projected per display element. In another embodiment, the predefined number of the plurality of image planes generated upon processing of the three-dimensional image is lesser than the number of the plurality of display elements within the multi-plane volumetric display. In such a case, there would exist at least one unused display element, after all image planes are projected upon the plurality of display elements. As an example, the number of plurality of display elements may be 10. In such a case, the three-dimensional image may be processed to generate 2, 3, 4, 5, 6, 7, 8, 9 or 10 image planes.

As mentioned previously, the volumetric display system comprises the projector communicably coupled to the graphics processing unit and the multi-plane volumetric display. Throughout the present disclosure, the term "projector" used herein relates to specialized equipment for projecting the plurality of image planes associated with the three-dimensional image upon the plurality of display elements of the multi-plane volumetric display. Examples of the projector include, but are not limited to, a setup with Digital Micro Mirror Devices (DMD technology by Texas Instruments®), a Liquid Crystal Display (LCD), a Liquid Crystal on Silicon (LCoS) or other type of spatial light modulator combined with a light source such as a Light Emitting Diode (LED) light source, high intensity discharge (HID) light source with colored filters, color lasers or other type of bright light sources.

The projector comprises the light source for emitting the light beam therefrom. Throughout the present disclosure, the term "light source" used herein relates to equipment that is used to emit the light beam therefrom. It will be appreciated that in operation, the light source is configured to emit the light beam of visible wavelength (namely, light of a wavelength that is visible to humans). Examples of the light source include, but are not limited to, at least one visible light-emitting diode, at least one visible light laser, a high intensity gas-discharge type bulb light source.

Optionally, the light source is implemented by way of a plurality of light-emitting diodes configured to emit light of at least three wavelengths, wherein at least one first light emitting diode is configured to emit light having a first wavelength, at least one second light emitting diode is configured to emit light having a second wavelength and at least one third light emitting diode is configured to emit light having a third wavelength.

Optionally, the second wavelength is greater than the first wavelength, but lesser than the third wavelength. As an example, the first wavelength may correspond to a blue colour light (namely, a wavelength lying between 440 nanometres to 470 nanometres), the second wavelength may correspond to a green colour light (namely, a wavelength lying between 520 nanometres to 550 nanometres), and the third wavelength may correspond to a red colour light (namely, a wavelength lying between 610 nanometres to 650 nanometres). Alternatively, optionally, the second wavelength is greater than the third wavelength, but lesser than the first wavelength. As an example, the first wavelength may correspond to a red colour light (namely, a wavelength lying between 610 nanometres to 650 nanometres), the second wavelength may correspond to a green colour light (namely, a wavelength lying between 520 nanometres to 550 nanometres), and the third wavelength may correspond to a blue colour light (namely, a wavelength lying between 440 nanometres to 470 nanometres).

Optionally, the light source is a truecolor light source. In such a case, the wavelength(s) of light emitted by the light source allow for rendition of truecolor within the displayed three-dimensional image. More optionally, the driver module is configured to control an intensity of the light beam that is emitted from the light source. As an example, the light source may comprise a red colour light emitting diode, a green colour light emitting diode, and a blue colour light emitting diode, wherein intensities of light emitted by the aforesaid light emitting diodes may be adjusted to provide truecolor within the displayed three-dimensional image.

Furthermore, the projector comprises the spatial light modulator arranged on the optical path of the emitted light beam. Throughout the present disclosure, the term "spatial light modulator" used herein relates to specialized equipment configured to modulate the emitted light beam. In other words, the spatial light modulator is configured to modulate an amplitude and/or phase of the emitted light beam in at least one dimension. Optionally, the spatial light modulator is implemented by way of at least one of: a digital micromirror device (DMD), a liquid-crystal based spatial light modulator, a liquid crystal on silicon (LCoS) type spatial light modulator. Typically, the digital micromirror device is an electro-optical micromechanical system, which in essence is an array of electrically controllable array of microscopic mirrors with a single mirror representing a pixel. Therefore, by varying position of the array of microscopic mirrors, light can be directed towards the telecentric projection arrangement (bright pixel or pixel-on) or diverted away from the telecentric projection arrangement (dark pixel or pixel-off). Optionally, an angular range for variation of the position of the array of microscopic mirrors (via movement of the array of microscopic mirrors) is, for example, +/−12 degrees from a default position thereof.

Optionally, when the spatial light modulator is implemented by way of the liquid-crystal based spatial light modulator, the projector further comprises at least one polarizer configured to provide polarized light to the spatial light modulator. In such a case, the at least one polarizer is configured to polarize the light beam emitted from the light source, prior to its incidence upon the spatial light modulator.

Optionally, the spatial light modulator is associated with a Total Internal Reflection (TIR) prism configured to direct the light beam emitted by the light source towards the spatial light modulator, and direct the modulated light beam from the spatial light modulator towards the telecentric projection arrangement. As an example, when the spatial light modulator is implemented by way of a single digital micromirror device (DMD), the spatial light modulator may also be associated with the Total Internal Reflection (TIR) prism. Alternatively, in case of utilizing a digital micromirror device (DMD) as a spatial light modulator, the unmodulated light beam from the light source can be directed towards the spatial light modulator without utilization of TIR-prism. The same applies also for gathering the modulated light beam and directing it towards the focusing arrangement. Such a design, generally, is considered a TIR-less design and offers benefits in terms of reduced cost due to omitted TIR-prism. Alternatively, if liquid crystal on silicon (LCoS) type spatial light modulator is utilized, the spatial light modulator is associated with a polarization-sensitive beam splitter or otherwise a polarization cube, which is used to direct the polarized unmodulated light from the light source towards the active area of the spatial light modulator and to extract the modulated light beam and direct it towards the focusing arrangement.

Moreover, the projector comprises the telecentric projection arrangement arranged on the optical path of the modulated light beam. Throughout the present disclosure, the term "telecentric projection arrangement" used herein relates to an arrangement of optical components that are configured to direct the modulated light beam towards the plurality of display elements whilst providing the substantially-constant magnification of the modulated light beam across the plurality of display elements. Notably, such magnification of the modulated light beam allows for the plurality of image planes to have the substantially-constant (namely, substantially-uniform) magnification. In other words, the telecentric projection arrangement allows for controlling the modulated light beam in a manner that differences in magnification of image planes at different depths, are imperceptible to the viewer's eyes. As a result, the viewer of the volumetric display system is able to perceive actual size of entities/attributes depicted in the displayed three-dimensional image. In addition the setup is able to perceive correct three-dimensional ratios for presented objects and scenes.

Optionally, the telecentric projection arrangement comprises:
 a focusing arrangement configured to focus the modulated light beam upon the plurality of display elements; and
 a beam forming and steering arrangement configured to collimate the modulated light beam and adjust the optical path of the modulated light beam.

Throughout the present disclosure, the term "focusing arrangement" used herein relates to an arrangement of optical components that is configured to focus the modulated light beam upon the plurality of display elements. Notably, the focusing arrangement allows for adjusting the optical path of the modulated light beam in a manner that the plurality of image planes are focused with an acceptable level of sharpness upon the plurality of display elements. Throughout the present disclosure, the term "beam forming and steering arrangement" used herein relates to an arrangement of optical components configured to collimate the modulated light beam and adjust the optical path of the modulated light beam. Notably, the beam forming and steering arrangement allows for shaping (notably, via collimation) and directing the modulated light beam in a manner that the plurality of image planes are projected upon the plurality of display elements of the multi-plane volumetric display. It will be appreciated that when the optical path of the collimated modulated light beam is adjusted to focus such a light beam upon the plurality of display elements, the plurality of image planes appear to have a substantially-constant magnification across the plurality of display elements. Further, depending on optical set up, the focusing arrangement might participate in the beam forming/perform a function of beam forming. As an example, if a system is used to present a three-dimensional image of a cube with the size of 5×5×5 cm$^3$ in the volumetric display system (with say 5 display elements spaced 1 cm apart from each other) a 5×5 cm square has to be projected to each of the 5 display elements. Since the modulated light beam is collimated processing of the three-dimensional image to generate a plurality of image planes (5 in this example) substantially same 5×5 square can be used for each plurality of image planes. Without collimation if "same 5×5 squares" would used for each plurality of image planes, the cube would appear to be distorted since display elements are at different distances from the projector.

Optionally, the telecentric projection arrangement is implemented by way of a plurality of optical elements, the focusing arrangement comprising at least one first optical element and the beam forming and steering arrangement comprising at least one second optical element. Throughout the present disclosure, the term "optical element" used herein relates to optical components (for example, such as lenses, mirrors, prisms, waveguides, and the like) for directing the modulated light beam towards the plurality of display elements in a manner that the plurality of image planes appear to have a substantially-constant magnification at the multi-plane volumetric display. As an example, the focusing arrangement may comprise 10 first optical elements (such as lenses, aperture devices, prisms, and the like) and the beam forming and steering arrangement may comprise 2 second optical elements (such as mirrors, waveguides, and the like).

Optionally, a size of at least one optical element of the plurality of optical elements is substantially equal to a size of the plurality of display elements of the multi-plane volumetric display. More optionally, a size of at least one second optical element is substantially equal to the size of the plurality of display elements of the multi-plane volumetric display. It will be appreciated that such at least one optical element having a size that is substantially equal to the size of the plurality of display elements, allows for providing the substantially-constant magnification of the modulated light beam across the plurality of display elements.

Optionally, the at least one first optical element is implemented by way of at least one of: a fixed-focus lens, a variable-focus (varifocal) lens, a spherical lens, an aspherical lens, a freeform lens, an aperture device. It will be appreciated that the at least one surface of the at least one first optical element could be a free form surface, an aspherical surface, a planar surface, a curved surface, or any combination thereof. In an example, the focusing arrangement may comprise 10 first optical elements. In such a case, the 10 first optical elements may be implemented by way of glass lens elements A, B, C, D, E, F, G, H, I and J. In such an example, the first optical elements A, B, C, D, F, G, H, I and J could be fixed-focus lenses, variable-focus lenses, a spherical lens, an aspherical lens, a freeform lens, an aperture device. Furthermore, the first optical element E could be an aperture device. Moreover, in such an example, the first optical elements A, F and J could have at least one freeform surface, the first optical elements B, D and I could have at least one aspherical surface whereas the first optical elements C, G and H could have the spherical surface.

Optionally, the at least one second optical element is implemented by way of at least one of: a spherical mirror, an aspherical mirror, a parabolic mirror, a plane mirror, a freeform mirror. It will be appreciated that a surface of the at least one second optical element could be a polynomial surface, a planar surface, or any combination thereof. In an example, the beam forming and steering arrangement may comprise 2 second optical elements. In such a case, the 2 second optical elements may be implemented by way of reflecting mirrors A and B. The second optical element A could be the freeform mirror whereas the second optical element B could be a parabolic mirror. Furthermore, in such an example, the second optical element B could have a size that is substantially equal to the size of the plurality of display elements of the multi-plane volumetric display.

Optionally, the telecentric projection arrangement further comprises at least one first actuator for moving the focusing arrangement with respect to the multi-plane volumetric display, and wherein the driver module is configured to control the at least one first actuator to adjust the focus of the modulated light beam upon the plurality of display elements. In other words, the at least one first actuator can be employed to move the at least one first optical element of the focusing arrangement, with respect to the multi-plane volumetric display, to adjust the focus of the modulated light beam upon the plurality of display elements. Such a movement of the at least one first optical element of the focusing arrangement allows for changing the optical path of the modulated light beam, and consequently, adjusting the focus of the modulated light beam upon the plurality of display elements. More optionally, the at least one first actuator is configured to displace the focusing arrangement, rotate the focusing arrangement and/or tilt the focusing arrangement with respect to the multi-plane volumetric display. As an example, the at least one first actuator may be configured to linearly displace the focusing arrangement closer or away from the multi-plane volumetric display, along a given optical axis. Further, the at least one first actuator can be implemented using electrically or otherwise controllable varifocal lens.

Optionally, the telecentric projection arrangement further comprises at least one second actuator for moving the beam forming and steering arrangement with respect to the plurality of display elements, and wherein the driver module is configured to control the at least one second actuator to adjust the collimation of the modulated light beam and the optical path of the modulated light beam. In other words, the at least one second actuator can be employed to move the at least one second optical element of the beam forming and steering arrangement, with respect to the multi-plane volumetric display, to collimate the modulated light and adjust the optical path of the modulated light beam upon the plurality of display elements. Such a movement of the at least one second optical element of the beam forming and steering arrangement allows for changing the optical path of the modulated light beam, and consequently, shaping (notably, via collimation) and directing the modulated light beam upon the plurality of display elements.

More optionally, the at least one second actuator is configured to displace the beam forming and steering arrangement, rotate the beam forming and steering arrangement and/or tilt the beam forming and steering arrangement with respect to the multi-plane volumetric display. More optionally, the at least one first actuator and/or one second actuator are used during the operation of the volumetric system or at the time of taking it in usage (calibration phase) or during maintenance or setup.

Optionally, a length of the optical path of the modulated light beam lies within a range of 60 centimetres to 80 centimetres. Generally, in conventional volumetric display systems, a length of an optical path of a given modulated light beam is of the order of 1.5-2 meters. Consequently, such conventional volumetric display systems are considerably bulkier and large in size since such a length of the aforesaid optical path is difficult to accommodate in devices with a small form-factor. However, it will be appreciated that the telecentric projection arrangement allows for extending and folding the optical path of the modulated light beam in a manner that the length of the optical path of the modulated light beam is substantially lesser (namely, shorter) than the length of the optical path of the given modulated light beam (of the conventional volumetric display systems). Notably, the main task of the focusing arrangement is to adjust the optical path of the modulated light beam passing therethrough while the main role of the beam forming and steering arrangement is to fold optical path and ensure collimation of the modulated light beam. Such adjustment of the length of the optical path of the modulated light beam allows for accommodating the volumetric display system of the present disclosure in compact, reduced dimension devices. The term "optical path" can be defined as a distance from a spatial light modulator to a multi-plane volumetric display.

In some implementations, the length of the optical path of the modulated light beam may be, for example, 60, 61, 62, 63, 64, 65, 66, 67, 68, 69, 70, 71, 72, 73, 74, 75, 76, 77, 78, 79 or 80 centimetres. In other implementations, the length of the optical path of the modulated light beam may be greater than 80 centimetres or lesser than 60 centimetres.

As mentioned previously, the projector comprises the driver module coupled to the light source and the spatial light modulator. Throughout, the present disclosure, the term "driver module" used herein relates to specialized equipment that is configured to control operations of the light source, and the spatial light modulator for projecting the plurality of image planes upon the plurality of display elements, by way of the modulated light beam. Specifically, the driver module is configured to receive the plurality of image planes corresponding to the three-dimensional image from the graphics processing unit and to project the plurality of image planes of the three-dimensional image upon their corresponding display elements. As an example, the driver module may receive 4 image planes corresponding to a given three-dimensional image from the graphics processing unit, and may subsequently control the light source and the spatial light modulator for projecting the 4 image planes upon 4 display elements of the multi-plane volumetric display.

Optionally the driver module is configured to control the telocentric projection arrangement to direct the modulated light beam towards the plurality of display elements, whilst providing the substantially-constant magnification thereof, across the plurality of display elements. The driver module can provide optional control signals to the optional at least one first and/or at least one second actuator.

Optionally, the driver module comprises a first driver unit, a second driver unit and a third driver unit, the first driver unit being configured to control the operation of the light source, the second driver unit being configured to control the operation of the spatial light modulator, and the third driver unit being configured to control the operation of the multi-plane volumetric display. Further optionally a fourth driver unit can be configured to control at least one first and/or at least one second actuator.

Optionally, the volumetric display system comprises a volumetric display driver coupled to the multi-plane volumetric display and the driver module of the projector, the volumetric display driver being configured to control operation of the plurality of display elements substantially synchronously with the projection of the plurality of image planes upon the plurality of display elements. The term "volumetric display driver" relates to specialized hardware, software, firmware, or a combination of these, that is configured to electrically control the operation of the plurality of display elements of the multi-plane volumetric display based upon a given image plane that is projected via the projector, at a given time. In an example, the driver module may control the light source, the spatial light modulator and volumetric driver unit when projecting 3 image planes IP1, IP2 and IP3 corresponding to a given three-dimensional image upon 3 display elements DE1, DE2 and DE3 respectively, by way of the modulated light beam. In such a case, when the image plane IP1 is to be projected upon the display element DE1, the volumetric display driver may be configured to switch the display element DE1 to the optically diffusive state while switching the remaining display elements DE2 and DE3 to the optically transparent state. Similarly, when the image plane IP2 is to be projected upon the display element DE2, the volumetric display driver may be configured to switch the display element DE2 to the optically diffusive state while switching the remaining display elements DE1 and DE3 to the optically transparent state. Furthermore, when the image plane IP3 is to be projected upon the display element DE3, the volumetric display driver may be configured to switch the display element DE3 to the optically diffusive state while switching the remaining display elements DE1 and DE2 to the optically transparent state. Therefore, it will be appreciated that the volumetric display driver may be configured to control the aforesaid switching operation of the plurality of display elements substantially synchronously with the projection of the plurality of image planes upon the plurality of display elements, to enhance the viewer's experience of viewing the given three-dimensional image.

Optionally, the driver module and/or the graphics processing unit is configured to digitally adjust images planes prior modulating the light bean to provide the substantially-constant magnification of the modulated light beam across the plurality of display elements. In a case, the driver module and/or the graphics processing unit may employ at least one image processing algorithm for adjusting optical properties of the modulated light beam in a manner that the substantially-constant magnification of the modulated light beam is provided across the plurality of display elements. Further the digital adjustment can refer to geometry corrections.

Optionally, the volumetric display system is implemented in a head-mounted display apparatus. In such implementation dimensions of the device and related optics should be scaled accordingly. Consequently, scaling affects not just the dimensionality of components but consequently also the length of the optical path. An example optical path with the head-mounted implementation is typically between 5 and 25 cm. When the volumetric display system is implemented in the head-mounted display apparatus for displaying the three-dimensional image, the actual physical depth associated with the three-dimensional image is depicted. In such a case, an eye strain and discomfort generally felt by the viewer, that are associated with use of two-dimensional displays in a stereoscopic-type 3D head-mounted display apparatus, are substantially reduced. It will be appreciated that the head-mounted display apparatus could be used for rendering simulated environments to the viewer. Therefore, when the head-mounted display apparatus is used for displaying the three-dimensional image, the viewer's experience of the simulated environment is substantially enhanced. Optionally, the simulated environment is one of: a virtual reality environment, a mixed reality environment, an augmented reality environment.

Optionally, at least the projector, the volumetric display driver and the multi-plane volumetric display of the volumetric display system are implemented within the head-mounted display apparatus. In such a case, the graphics processing unit could be implemented within the head-mounted display apparatus, or otherwise it might be implemented remotely.

Optionally, the volumetric display system further comprises a power source, the power source being configured to provide electrical power to at least the driver module of the projector. Optionally, the power source is further configured to provide electrical power to the graphics processing unit and/or the volumetric display driver. In an example, the power source may provide 12 volts direct current electrical supply to the driver module of the projector and may provide 200 volts electrical supply to the volumetric display driver.

The present disclosure also relates to the method as described above. Various embodiments and variants disclosed above apply mutatis mutandis to the method.

Optionally, in the method, directing the modulated light beam, whilst providing the substantially-constant magnification of the modulated light beam comprises:
focusing the modulated light beam;
collimating the modulated light beam; and
adjust the optical path of the modulated light beam.

Optionally, the method further comprises adjusting the focus of the modulated light beam.

Optionally, the method further comprises adjusting the collimation of the modulated light beam.

Optionally, in the method, the length of the optical path of the modulated light beam lies within the range of 60 centimetres to 80 centimetres.

Optionally, the method further comprises digitally adjusting images planes prior modulating the light bean to provide the substantially-constant magnification of the modulated light beam. In additional, or alternative method can comprise digitally adjusting images planes to perform geometrical corrections of corresponding image planes. In addition, digital adjustments can be made to ensure projection of substantially rectilinear image slice on respective optical element.

DETAILED DESCRIPTION OF THE DRAWINGS

Referring to FIG. 1, illustrated is a schematic illustration of a volumetric display system 100 for displaying a three-dimensional image (not shown) in accordance with an embodiment of the present disclosure. The volumetric display system 100 comprises a multi-plane volumetric display 102 comprising a plurality of display elements 104, wherein one plane of the volumetric display is implemented by way of one display element; a graphics processing unit 106 configured to process the three-dimensional image to generate a plurality of image planes corresponding thereto; and a projector 108 communicably coupled to the graphics processing unit 106 (via a driver module 116) and the multi-plane volumetric display 102. As shown, the projector 108 comprises a light source 110 for emitting a light beam A therefrom, a spatial light modulator 112, a telecentric projection arrangement 114, and a driver module 116 coupled to the light source 110, and the spatial light modulator 112. The spatial light modulator 112 is arranged on an optical path of the emitted light beam A, the spatial light modulator 112 being configured to modulate the emitted light beam A. The telecentric projection arrangement 114 is arranged on an optical path of the modulated light beam B, the telecentric projection arrangement 114 being configured to direct the modulated light beam B towards the plurality of display elements 104, whilst providing a substantially-constant magnification of the modulated light beam B across the plurality of display elements 104. Furthermore, the driver module 116 is configured to receive the plurality of image planes corresponding to the three-dimensional image from the graphics processing unit 106, and to control operations of the light source 110, and the spatial light modulator 112 for projecting the plurality of image planes upon the plurality of display elements 104, by way of the modulated light beam B. Furthermore, the volumetric display system 100 optionally comprises a volumetric display driver (not shown) coupled to the multi-plane volumetric display 102 and the driver module 116 of the projector 108, the volumetric display driver being configured to control operation of the plurality of display elements 104 substantially synchronously with the projection of the plurality of image planes upon the plurality of display elements 104.

Figure 2:
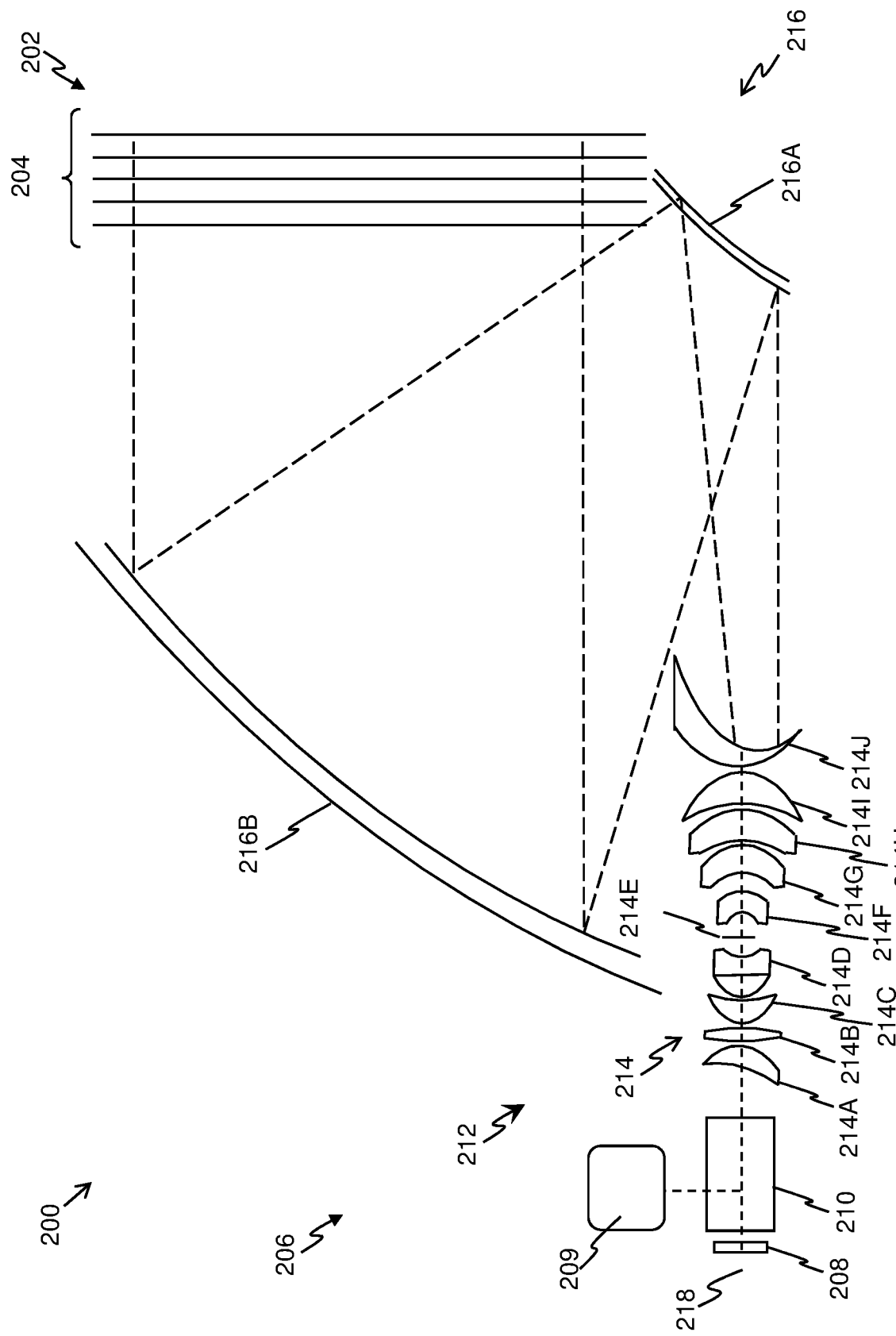
FIG. 2 is an exemplary implementation of a volumetric display system for displaying a three-dimensional image, in accordance with an embodiment of the present disclosure.

Referring to FIG. 2, illustrated is an exemplary implementation of a volumetric display system 200 for displaying a three-dimensional image (not shown), in accordance with an embodiment of the present disclosure. The volumetric display system 200 comprises a multi-plane volumetric display 202 comprising a plurality of display elements 204, wherein one plane of the volumetric display is implemented by way of one display element; a graphics processing unit (not shown) configured to process the three-dimensional image to generate a plurality of image planes corresponding thereto; and a projector 206 communicably coupled to the graphics processing unit and the multi-plane volumetric display 202. As shown, the projector 206 comprises a light source 209 for emitting a light beam therefrom, a spatial light modulator 208 being configured to modulate the emitted light, a telecentric projection arrangement 212, and a driver module (not shown) coupled to the light source 209, the spatial light modulator 208 and the telecentric projection arrangement 212. A Total Internal Reflection (TIR) prism 210 is arranged on an optical path of the emitted modulated light beam, the TIR prism 210 being configured to direct the modulated light beam from the spatial light modulator 208 towards the telocentric projection arrangement 212. The telecentric projection arrangement 212 is arranged on an optical path of the modulated light beam, the telecentric projection arrangement 212 being configured to direct the modulated light beam towards the plurality of display elements 204, whilst providing a substantially-constant magnification of the modulated light beam across the plurality of display elements 204. Furthermore, the driver module is configured to receive the plurality of image planes corresponding to the three-dimensional image from the graphics processing unit, and to control operations of the light source 209 the spatial light modulator 208 and the telecentric projection arrangement 212 for projecting the plurality of image planes upon the plurality of display elements 204, by way of the modulated light beam. In such an exemplary implementation, the plurality of display elements 204 are implemented by way of a plurality of (electrically controllable) optical diffusers.

As shown, the telecentric projection arrangement 212 comprises a focusing arrangement 214 configured to focus the modulated light beam upon the plurality of display elements 204, and a beam forming and steering arrangement 216 configured to collimate the modulated light beam and adjust the optical path of the modulated light beam. Furthermore, the telecentric projection arrangement 212 is implemented by way of a plurality of optical elements, the focusing arrangement 214 comprising at least one first optical element, depicted as first optical elements 214A-214J and the beam forming and steering arrangement 216 comprising at least one second optical element, depicted as second optical elements 216A and 216B. As shown, the at least one first optical element 214A-214J is implemented by way of lens elements, wherein the first optical elements 214A, 214F and 214J have one free form surface; the first optical elements 214B, 214D and 214I have aspherical surfaces; the first optical elements 214C, 214G and 214H are conventional curved-surface spherical lenses; and the first optical element 214E is an aperture device. The first optical elements 214A, 214B, 214C, 214D, 214F, 214G, 214H, 214I and 214J could be fixed-focus lenses, variable-focus lenses, spherical lenses, aspherical lenses, freeform lenses. The at least one second optical element 216A and 216B are implemented by way of reflective mirrors, wherein the second optical element 216A is a spherical mirror having a polynomial surface and the second optical element 216B is a parabolic mirror. Furthermore, a size of at least one optical element of the plurality of optical elements is substantially equal to a size of the plurality of display elements 204 of the multi-plane volumetric display 202. As shown, a size of the second optical element 216B is substantially equal to a size of the plurality of display elements 204 of the multi-plane volumetric display 202. Furthermore, the focusing arrangement 214 can be moved with respect to the multi-plane volumetric display 202 to adjust the focus of the modulated light beam upon the plurality of display elements 204. In an example, the focusing arrangement 214 can be linearly displaced along an optical axis 218 to implement the aforesaid focusing operation.

Figure 3:
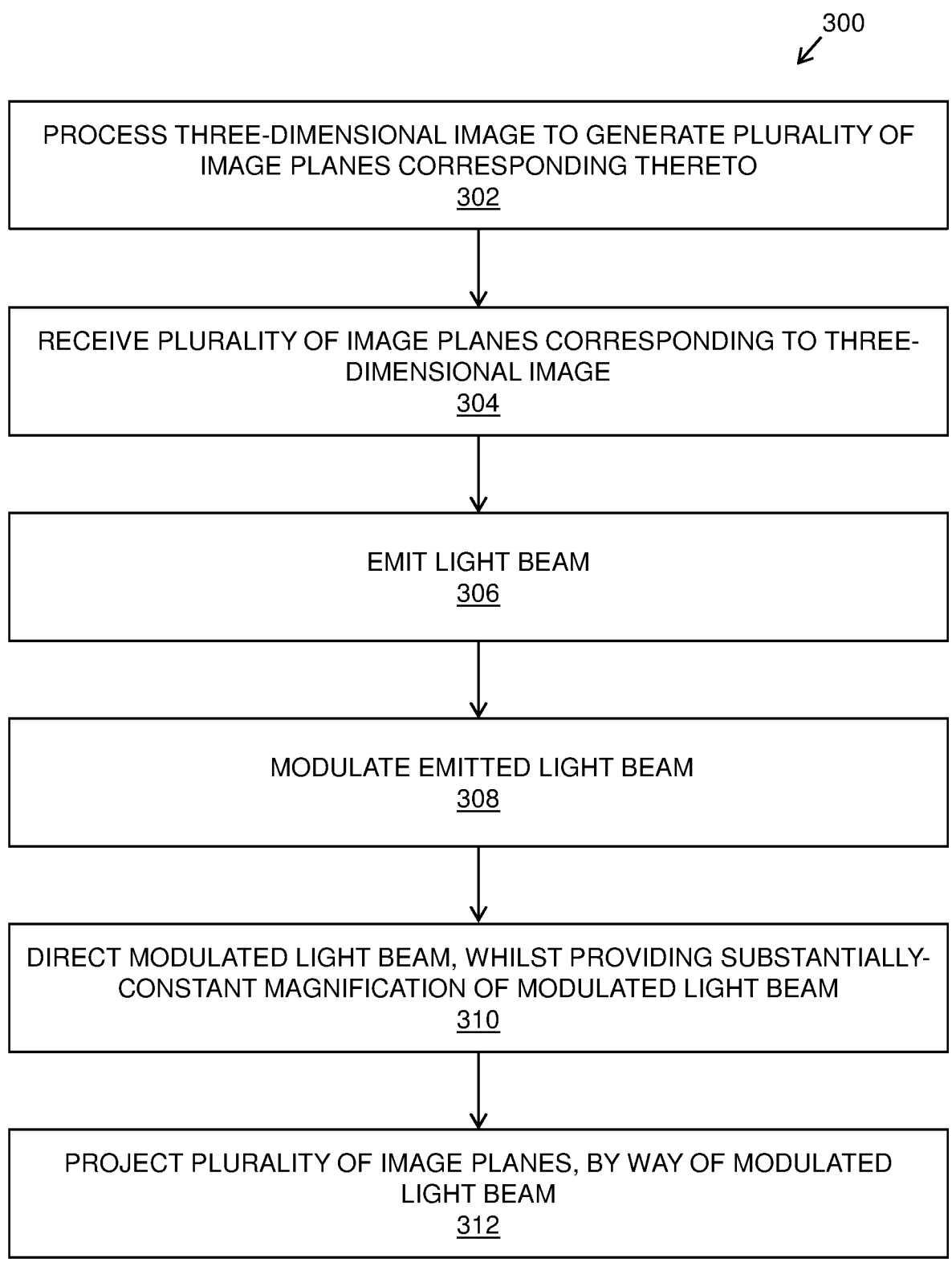
FIG. 3 illustrates steps of a method of displaying a three-dimensional image, via a volumetric display system, in accordance with an embodiment of the present disclosure.

Referring to FIG. 3, illustrated are steps of a method 300 of displaying a three-dimensional image, via a volumetric display system, in accordance with an embodiment of the present disclosure. At step 302, the three-dimensional image is processed to generate a plurality of image planes corresponding thereto. At step 304, the plurality of image planes corresponding to the three-dimensional image are received by driver module. At step 306, a light beam is emitted. At step 308, the emitted light beam is modulated. At step 310, the modulated light beam is directed, whilst providing a substantially-constant magnification of the modulated light beam. It is good to note that some of the steps take place simultaneously. At step 312, the plurality of image planes are projected, by way of the modulated light beam.

The steps 302 to 312 are only illustrative and other alternatives can also be provided where one or more steps are added, one or more steps are removed, or one or more steps are provided in a different sequence without departing from the scope of the claims herein.

Figure 4:
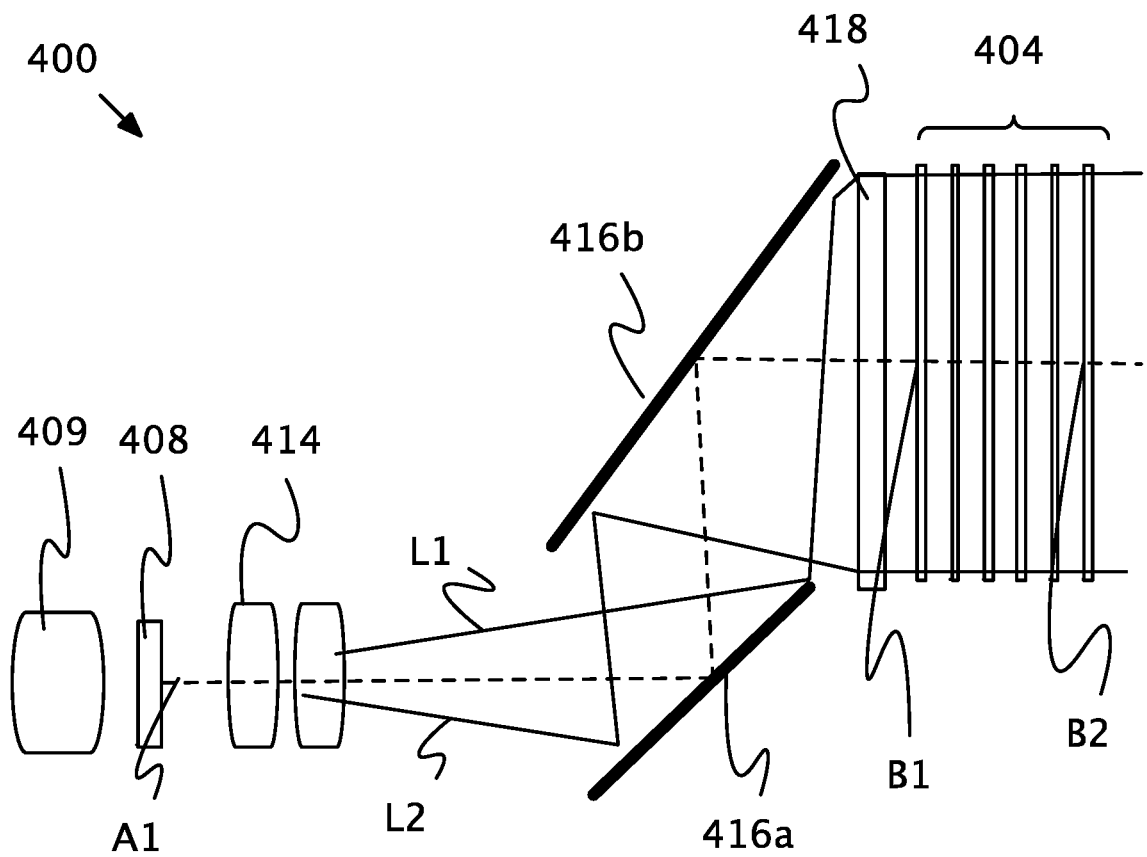
FIG. 4 is an exemplary implementation of a volumetric display system for displaying a three-dimensional image, in accordance with an embodiment of the present disclosure.

An alternative/additional schematic example of a volumetric display system 400 is illustrated in FIG. 4. A spatial light modulator 408 receives an incident unmodulated light beam from a light source 409 and associated optics (not shown) and transfers a modulated light beam (L1 and L2) towards a plurality of display elements of a multi-plane volumetric display 404. The dashed line marks the optical axis of the volumetric display system 400 and the distance along the optical axis between the points A1 and B1 (B2) in context of the present disclosure is considered an optical path. On the optical path A1-B1 between the spatial light modulator 408 and the multi-plane volumetric display 404 optical and/or electrooptical components are arranged. A focusing arrangement 414 (such as a projection lens) is configured to focus the modulated light beam upon the plurality of display elements of the multi-plane volumetric display 404. A beam forming and steering arrangement comprises of a first planar folding mirror 416a and a second planar folding mirror 416b and a collimating element 418. The role of the first planar folding mirror 416a and the second planar folding mirror 416b is to fold the optical path thus reducing one of the linear dimensions of the display apparatus. The main role of the collimating element 418 is to ensure that the image magnification is substantially constant across the whole volume of the plurality of display elements of a multi-plane volumetric display 404. The collimating elements 418 can be, for example, a Fresnel-type lens, a gradient-index lens, etc. Moreover, the size of at least one of the elements of the beam forming and steering arrangement is substantially equal to the size of the projection volume corresponding to the size of display elements 404. The collimating element 418 further ensures that the beam of light (L1 and L2) is substantially collimated when inside of the volume of the plurality of display elements of a multi-plane volumetric display 404.

Figure 5:
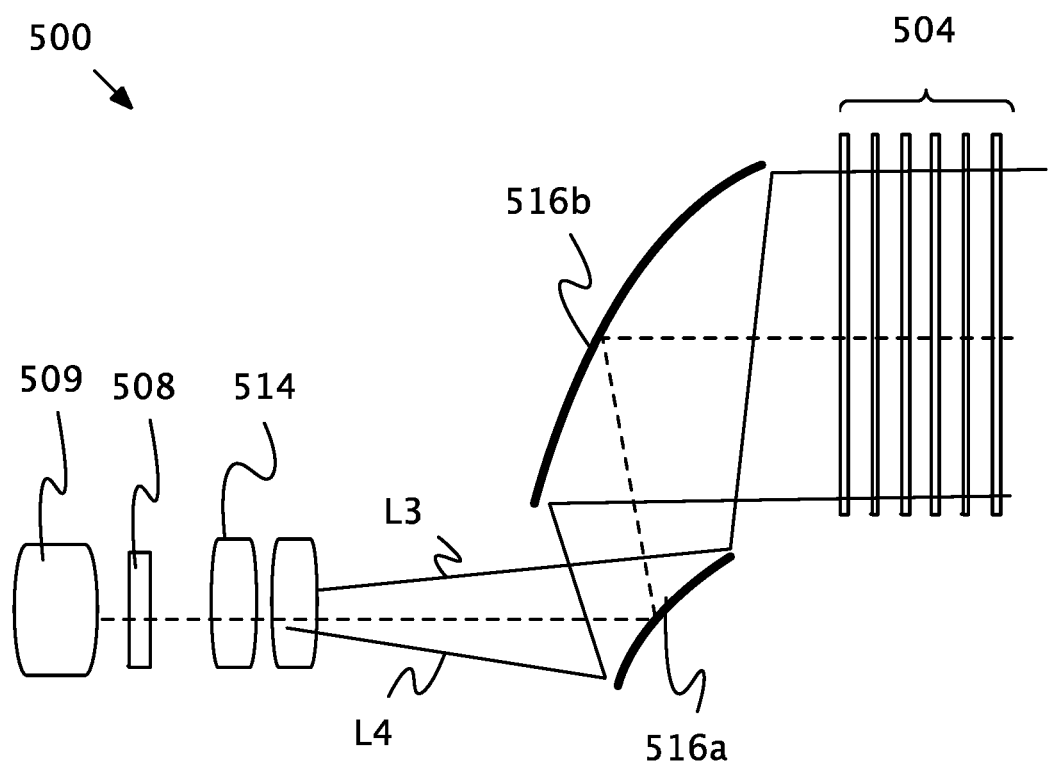
FIG. 5 is an exemplary implementation of a volumetric display system for displaying a three-dimensional image, in accordance with an embodiment of the present disclosure.

A further alternative/additional schematic example of a volumetric display system 500 is illustrated in FIG. 5. A spatial light modulator 508 receives an incident unmodulated light beam from a light source 509 and associated optics (not shown) and transfers a modulated light beam (L3 and L4) towards a plurality of display elements of a multi-plane volumetric display 504. The dashed line marks the optical axis of the volumetric display system 500. On an optical path between the spatial light modulator 508 and the multi-plane volumetric display 504 optical and/or electrooptical components are arranged. A focusing arrangement 514 (such as a projection lens) is configured to focus the modulated light beam upon the plurality of display elements of the multi-plane volumetric display 504. A beam forming and steering arrangement comprises of a first convex parabolic mirror 516a and a second concave parabolic mirror 516b. The first convex parabolic mirror 516a and the second concave parabolic mirror 516b have roles of folding the optical path thus reducing one of the linear dimensions of the display apparatus and collimating light to ensure that the image magnification is substantially constant across the whole volume of the plurality of display elements of a multi-plane volumetric display 504. The collimation further ensures that the beam of light (L3 and L4) casts substantially parallel light rays within the volume of the plurality of display elements of a multi-plane volumetric display 504.

Modifications to embodiments of the present disclosure described in the foregoing discussion are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A volumetric display system for displaying a three-dimensional image, the volumetric display system comprising
 a multi-plane volumetric display comprising a plurality of optical diffuser display elements, wherein physical image depth planes of the volumetric display are implemented by way of the plurality of optical diffuser display elements;
 a graphics processing unit configured to process the three-dimensional image to generate a plurality of image planes corresponding thereto; and
 a projector communicably coupled to the graphics processing unit and the multi-plane volumetric display, wherein the projector comprises:
  a light source for emitting a light beam therefrom;
  a spatial light modulator arranged on an optical path of the emitted light beam, the spatial light modulator being configured to modulate the emitted light beam;
  a telecentric projection arrangement arranged on an optical path of the modulated light beam, the telecentric projection arrangement being configured to direct the modulated light beam towards the plurality of optical diffuser display elements;

a driver module coupled to the light source the spatial light modulator, wherein the driver module is configured to receive the plurality of image planes corresponding to the three-dimensional image from the graphics processing unit, and to control operations of the light source and the spatial light modulator for projecting the plurality of image planes upon the plurality of display elements, by way of the modulated light beam; and a volumetric display driver coupled to the multi-plane volumetric display and the driver module, the volumetric display driver begin configured to control operation of the plurality of optical diffuser display elements synchronously with the projection of the plurality of image planes upon the plurality of optical diffuser display elements, such that the physical image depth planes appear to have a constant magnification across the plurality of optical diffuser display elements.

2. The volumetric display system of claim 1, wherein the telecentric projection arrangement comprises
a focusing arrangement configured to focus the modulated light beam upon the plurality of display elements; and
a beam forming and steering arrangement configured to collimate the modulated light beam and adjust the optical path of the modulated light beam.

3. The volumetric display system of claim 2, wherein the telecentric projection arrangement is implemented by way of a plurality of optical elements, the focusing arrangement comprising at least one first optical element and the beam forming and steering arrangement comprising at least one second optical element.

4. The volumetric display system of claim 3, wherein a size of at least one optical element of the plurality of optical elements is equal to a size of the plurality of display elements of the multi-plane volumetric display.

5. The volumetric display system of claim 3, wherein the at least one first optical element is implemented by way of at least one of: a fixed-focus lens, a variable-focus lens, a spherical lens, an aspherical lens, a freeform lens, an aperture device.

6. The volumetric display system of claim 3, wherein the at least one second optical element is implemented by way of at least one of: a spherical mirror, an aspherical mirror, a parabolic mirror, a plane mirror, a freeform mirror.

7. The volumetric display system of claim 2, wherein the telecentric projection arrangement further comprises at least one first actuator for moving the focusing arrangement with respect to the multi-plane volumetric display, and wherein the driver module is configured to control the at least one first actuator to adjust the focus of the modulated light beam upon the plurality of display elements.

8. The volumetric display system of claim 2, wherein the telecentric projection arrangement further comprises at least one second actuator for moving the beam forming and steering arrangement with respect to the plurality of display elements, and wherein the driver module is configured to control the at least one second actuator to adjust the collimation of the modulated light beam and the optical path of the modulated light beam.

9. The volumetric display system of claim 1, wherein a length of the optical path of the modulated light beam lies within a range of 60 centimeters to 80 centimeters.

10. The volumetric display system of claim 1, wherein one of the driver module or the graphics processing unit is configured to digitally adjust images planes prior modulating the light bean to provide the constant magnification of the modulated light beam across the plurality of display elements.

11. The volumetric display system of claim 1, wherein the plurality of display elements are implemented by way of a plurality of optical diffusers which are electrically controllable.

12. The volumetric display system of claim 1, wherein the volumetric display system is implemented in a head-mounted display apparatus.

13. A method of displaying a three-dimensional image, the method comprising:
processing the three-dimensional image to generate a plurality of image planes corresponding thereto;
receiving the plurality of image planes corresponding to the three-dimensional image;
emitting a light beam;
modulating the emitted light beam;
directing the modulated light beam;
projecting the plurality of image planes onto corresponding optical diffuser display elements, by way of the modulated light beam; and
controlling operation of the plurality of optical diffuser display elements synchronously with the projection of the plurality of image planes upon the plurality of optical diffuser display elements, such that the image planes appear to have a constant magnification across the plurality of optical diffuser display elements.

14. The method of claim 13, wherein directing the modulated light beam, whilst providing the constant magnification of the modulated light beam comprises:
focusing the modulated light beam;
collimating the modulated light beam; and
adjust an optical path of the modulated light beam.

15. The method of claim 13, further comprising adjusting the focus of the modulated light beam.

16. The method of claim 13, further comprising adjusting the collimation of the modulated light beam.

17. The method of claim 13, wherein a length of the optical path of the modulated light beam lies within a range of 60 centimeters to 80 centimeters.

* * * * *